United States Patent
Pankratz et al.

(10) Patent No.: US 12,298,168 B2
(45) Date of Patent: May 13, 2025

(54) FILL LEVEL MEASUREMENT DEVICE

(71) Applicant: Endress+Hauser SE+Co. KG, Maulburg (DE)

(72) Inventors: Klaus Pankratz, Kandern (DE); Rolf Schwald, Schopfheim (DE); Klaus Feisst, Stegen (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 697 days.

(21) Appl. No.: 17/261,135

(22) PCT Filed: Jun. 13, 2019

(86) PCT No.: PCT/EP2019/065452
§ 371 (c)(1),
(2) Date: Jan. 18, 2021

(87) PCT Pub. No.: WO2020/015934
PCT Pub. Date: Jan. 23, 2020

(65) Prior Publication Data
US 2021/0293602 A1 Sep. 23, 2021

(30) Foreign Application Priority Data
Jul. 16, 2018 (DE) .................. 10 2018 117 164.1

(51) Int. Cl.
*G01F 23/284* (2006.01)
*H01Q 19/08* (2006.01)

(52) U.S. Cl.
CPC ........... *G01F 23/284* (2013.01); *H01Q 19/08* (2013.01)

(58) Field of Classification Search
CPC ..................... G01F 23/284; H01Q 19/08
See application file for complete search history.

(56) References Cited

U.S. PATENT DOCUMENTS 3,828,284 A  8/1974  Hutchins, IV
5,703,289 A * 12/1997  Mulrooney ........... G01F 23/284
                                                  333/252

(Continued)

FOREIGN PATENT DOCUMENTS

CN     101233392 A    7/2008
CN     103097865 A    5/2013

(Continued)

OTHER PUBLICATIONS

T. Boretius et al., "Exploring the limits of helium spray tests," 2013 6th International IEEE/EMBS Conference on Neural Engineering (NER), San Diego, CA, USA, 2013, pp. 868-871 (Year: 2013).*

(Continued)

*Primary Examiner* — Vladimir Magloire
*Assistant Examiner* — Noah Yi Min Zhu
(74) *Attorney, Agent, or Firm* — Gil M. Repa; Endress+Hauser (USA) Holding, Inc.

(57) ABSTRACT

The disclosure relates to a radar-based, fill level measurement device for determining a fill level of a fill substance located in a container. The fill level measurement device includes a high frequency unit for producing high frequency signals and for determining fill level based on received high frequency signals. A hollow conductor is provided for transmitting or receiving high frequency signals. The hollow conductor is subdivided into a first portion facing the high frequency unit, and a second portion faceable toward the fill substance, wherein an insulation transparent for the high frequency signals separates the first portion fluidically from the second portion. A first hollow space is connected fluidically with the second portion and the first hollow space is arranged relative to the second portion behind the insulation. Thus condensate formation on the insulation is prevented, so (Continued)

that the functioning of fill level measurement device is not degraded.

7 Claims, 2 Drawing Sheets

(56) References Cited

U.S. PATENT DOCUMENTS

| | | | | |
|---|---|---|---|---|
| 8,842,039 | B2* | 9/2014 | Fredriksson | G01F 23/284 |
| | | | | 73/290 R |
| 9,110,165 | B2* | 8/2015 | Feisst | H01Q 1/225 |
| 10,205,245 | B2* | 2/2019 | Falk | H01Q 13/0283 |
| 10,224,597 | B2* | 3/2019 | Blodt | H01Q 13/02 |
| 2008/0100501 | A1 | 5/2008 | Edvardsson | |
| 2013/0014592 | A1* | 1/2013 | Mueller | G01N 29/2437 |
| | | | | 73/861.27 |
| 2022/0291331 | A1* | 9/2022 | Dieterle | G01F 23/296 |

FOREIGN PATENT DOCUMENTS

| | | |
|---|---|---|
| DE | 10057441 A1 | 5/2002 |
| DE | 102012103493 A1 | 10/2013 |
| EP | 2667163 A1 | 11/2013 |
| WO | 2018114186 A1 | 6/2018 |

OTHER PUBLICATIONS

"Thermal conductance and resistance," Wikipedia, Jan. 10, 2018 (Year: 2018).*

* cited by examiner

FILL LEVEL MEASUREMENT DEVICE

CROSS-REFERENCE TO RELATED APPLICATIONS

The present application is related to and claims the priority benefit of German Patent Application No. 10 2018 117 164.1, filed on Jul. 16, 2018 and International Patent Application No. PCT/EP2019/065452, filed on Jun. 13, 2019, the entire contents of which are incorporated herein by reference.

TECHNICAL FIELD

The invention relates to a radar-based, fill level measurement device for measuring a fill level of a fill substance located in a container.

BACKGROUND

In automation technology, especially in process automation technology, field devices are often applied, which serve for registering and/or for influencing process variables. For registering process variables, sensors are applied, which are used, for example, in fill level measurement devices, flow measuring devices, pressure- and temperature measuring devices, pH-redox potential measuring devices, conductivity measuring devices, etc. These register the corresponding process variables, such as fill level, flow, pressure, temperature, pH value, redox potential and conductivity. A large number of these field devices are produced and sold by the firm, Endress+Hauser.

For fill level measurement in the case of fill substances in containers, contactless measuring methods have proven themselves, since they are robust and require low-maintenance. A further advantage of contactless measuring methods is their ability to measure fill level virtually continuously, such that they can provide a high resolution. For this reason, primarily radar-based measuring methods are applied. Established measuring principles in such case are the FMCW measuring principle ("Frequency Modulated Continuous Wave") and the pulse travel time method. In both cases, the radar signal is transmitted from an antenna, which is secured on the container and directed into the interior of the container. The radar signal travels in the direction of the fill substance and is received back after reflection. In such case, the frequencies of the transmitted electromagnetic waves lie in the region of a standardized center frequency. Thus, the terms "radar" and "high frequency signal" refer within the scope of the invention to frequencies between 0.3 GHz and 300 GHz. Because of governmental regulations, as a rule, a frequency at 6 GHz, 26 GHz, or 79 GHz is used. The functional principle of the pulse travel time method is described, for example, in DE 10 2010 063 430 A1, while the functional principle of the FMCW measuring method is covered, by way of example, in WO 2012/139852 A1. Independently of the measuring principle, higher frequencies are advantageous, since with rising frequency potentially also the resolution of the fill level measurement rises.

Depending on intended use of the container, temperatures of up to 200° C. and overpressures of a number of bar can reign in the container interior. In such case, a special challenge is to isolate the fill level measurement device fluidically from the container interior, since, depending on fill substance, in given cases, condensate can penetrate via the antenna, and the following hollow conductor, into the fill level measurement device. In this way, in turn, the functioning of the fill level measurement device can deteriorate.

In order to prevent this, the hollow conductor is subdivided into two portions, wherein the second portion faces the antenna and, thus, the fill substance. In such case, a temperature- and pressure blocking insulation transparent for the high frequency signals isolates the first portion fluidically from the second portion. In this way, a penetration of gaseous fill substance into the fill level measurement device is prevented. However, it is in the case of this construction not excluded that condensate deposits on the insulation and, as a result, blocks transmission of the high frequency signals in the hollow conductor.

SUMMARY

An object of the invention, therefore, is to provide a fill level measurement device, which can be applied in the case of high temperatures and pressures in a container.

The invention achieves this object by a fill level measurement device for determining a fill level of a fill substance located in a container, comprising:
  a high frequency unit, which is designed to produce and/or process high frequency signals for determining fill level,
  a hollow conductor, which is coupled to the high frequency unit for transmitting the high frequency signals to the fill substance and/or for receiving high frequency signals reflected on the fill substance, wherein the hollow conductor is subdivided into
    a first portion facing the high frequency unit, and,
    faceable toward the fill substance, a second portion, whose opening into the container can be made to expand conically, in order to form an antenna,
  and
  an insulation transparent for the high frequency signals and separating the first portion fluidically from the second portion.

According to the invention, the fill level measurement device is distinguished by a first hollow space, which is connected fluidically with the second portion. In such case, the first hollow space is arranged relative to the second portion behind the insulation. In this connection, a fluidic connection is defined as a material-permeable connection, by which a pressure equalization between the connected chambers is produced. The fluidically connected hollow space preferentially collects possible condensate from the interior of the container, since the first hollow space is located relative to the potentially hot container interior in an, in principle, colder region behind the insulation. In this way, the insulation remains free of condensate.

Due in the case of high frequencies to the, in principle, smaller dimensions of the hollow conductor, the invention is especially advantageous for the fill level measurement device when the high frequency unit is designed to produce high frequency signals with frequencies greater than 75 GHz, especially greater than 100 GHz.

Preferably, thermal resistance of the hollow conductor between the insulation and the first hollow space is so dimensioned that, at a temperature in the container of at least 180° C., the temperature difference to the temperature in the first hollow space amounts to at least 30° C. This increases the condensation rate in the first hollow space, and lessens the risk of condensate formation on the insulation. In this connection, thermal resistance of the hollow conductor between the insulation and the first hollow space can be set, on the one hand, by corresponding dimensioning of the distance between the insulation and the first hollow space, or by the cross sectional area of the hollow conductor in this region. On the other hand, thermal resistance can be correspondingly influenced by the material of the hollow conductor, for example, stainless steel having a thermal conductivity 2H of 15 W/(m*K).

Besides the setting of thermal resistance, the risk of condensate formation on the insulation can be supplementally reduced by a second hollow space fluidically connected with the second portion. In such case, the second hollow space is arranged relative to the second portion in front of the insulation. As a result of the additional, second hollow space, the pressure rise in the total hollow space is slowed and the pressure necessary for a condensate formation, thus, the partial pressure of the gas at hollow space temperature, is reached significantly later.

The fluidic connection can be produced in simple manner by connecting the first hollow space by a screw thread fluidically with the second portion. This can be realized, for example, by designing the hollow conductor such that the second portion forms a holder for the first portion. Alternatively, it is naturally likewise an option to implement the fluidic connection structurally completely detached from the mechanical securement of the two portions.

The invention does not exclude that the fill level measurement device of the invention includes, such as known from the state of the art, a process isolation supplementally to the insulation in the hollow conductor. In such case, the process isolation blocks the second portion of the hollow conductor from the fill substance. Since such process isolations are produced, as a rule, from a plastic-material, such as PMMA, PTFE or PS, transparent for the high frequency signals, it can occur that the process isolation is insufficiently shape-interlocked with the hollow conductor. Therefore, it can in these cases be advantageous that a fluidic seal is arranged between the process isolation and the end region of the second portion, especially a fluidic seal composed of at least two sealing rings. When the fill level measurement device of the invention includes an additional process isolation, the first hollow space can be designed in such a manner as a function of the permeability coefficient of the fluidic seal, such that the volume of the hollow space is dimensioned with at least 1.2 cm³ per a permeability coefficient of the seal of 10-12 kg/(s*bar). This dimensioning assures that the first hollow space does not completely fill with condensate over a sufficient time period of use of the device. Thus, a sufficient lifetime of the fill level measurement device is assured.

The invention will now be explained in greater detail based on the appended drawing, the figures of which show as follows:

DETAILED DESCRIPTION

Figure 1:
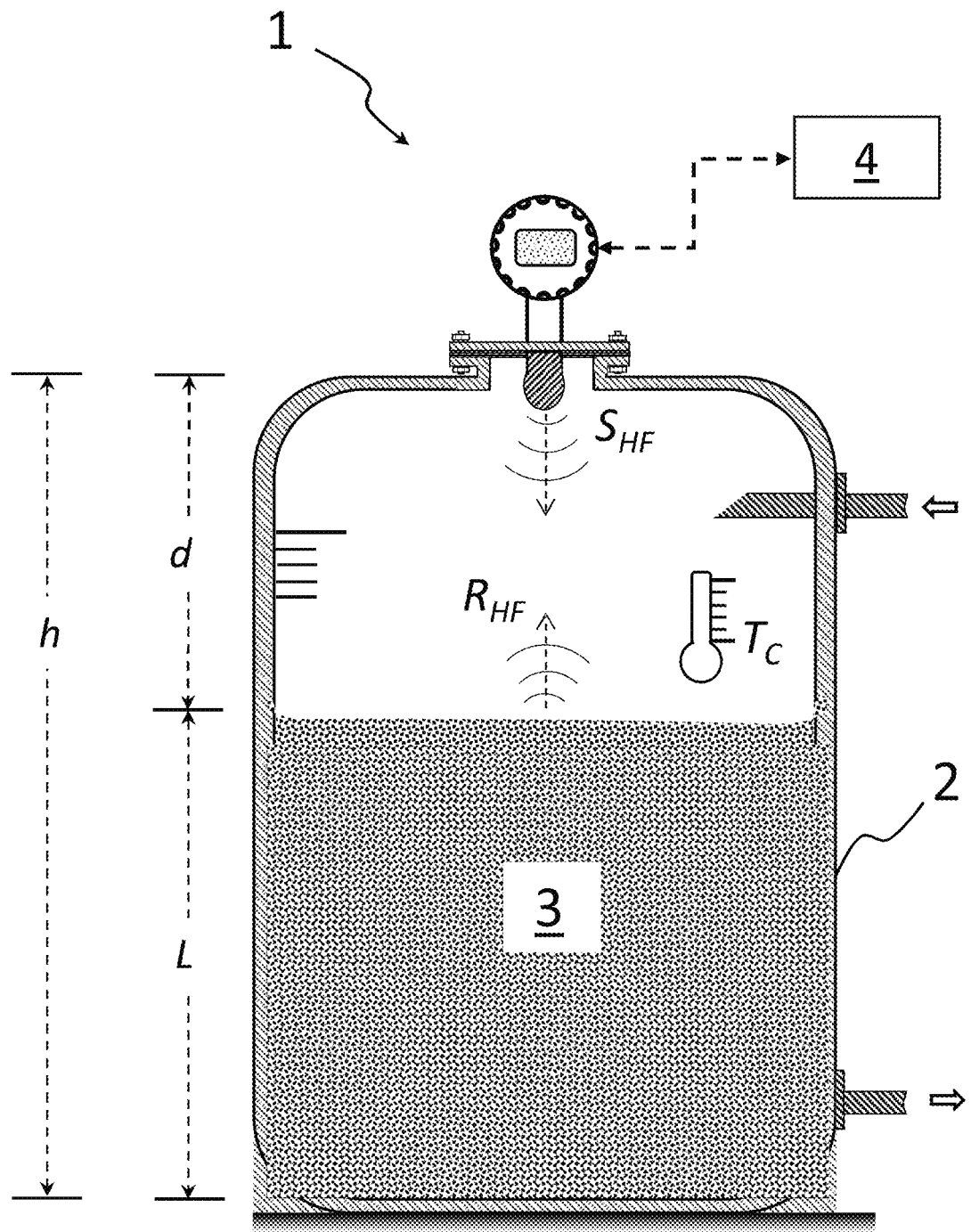
FIG. 1 shows an arrangement, in principle, of a fill level measurement device of the present disclosure mounted on a container.

In order to provide a basic understanding of the invention, shows FIG. 1 an arrangement of a radar-based, fill level measurement device 1 of the invention on a container 2.

Located in the interior of the container 2 is a fill substance 3, whose fill level L is to be determined.

For determining the fill level L, the fill level measurement device 1 is mounted on the container 2 above the fill substance 3 at a previously known, installed height h relative to the container floor. Depending on container size, it can be even greater than 100 m.

The fill level measurement device 1 is so arranged on the top of the container 2 that it can transmit high frequency signals $S_{HF}$ toward the fill substance 3. That can occur using the FMCW method or the pulse travel time method, for example, at a frequency of 79 GHz or higher.

After reflection on the fill substance surface, the fill level measurement device 1 receives the reflected high frequency signals $R_{HF}$, wherein the travel time measured by the fill level measurement device 1 between transmitting and receiving the high frequency signals $S_{HF}$, $R_{HF}$ depends on the distance d to the fill substance surface. The subsequent calculation of the fill level L from the travel time, or the distance d, to the fill substance surface is done by the fill level measurement device 3 using its installed height h:

$$L=h-d$$

The fill level measurement device 1 of the invention can, such as shown in FIG. 1, be connected by means of a bus system, for instance, a "PROFIBUS", "HART" or "wireless HART" bus system, to a superordinated unit 4, for example, a process control system, or a decentral database. In this way, on the one hand, information concerning the fill level L can be transmitted, in order, in given cases, to control in- or outgoing flows to or from the container 2. Also information concerning the operating state of the fill level measurement device 1 can be communicated.

Depending on application, a temperature $T_C$ of up to 200° C., or even more, and/or a positive pressure of a number of bar can reign in the interior of the container 2, for example, due to a chemical reaction, which the fill substance 3 momentarily undergoes in the container 2. Moreover, in given cases, corrosive fill substances 3 can, because of bubble formation or overfilling, come into direct contact with the fill level measurement device 1. These influences can degrade the functioning of the fill level measurement device 1. Besides the limited temperature stability of the electronic components of the fill level measurement device 1, especially condensate formation can be experienced in the fill level measurement device 1.

Figure 2:
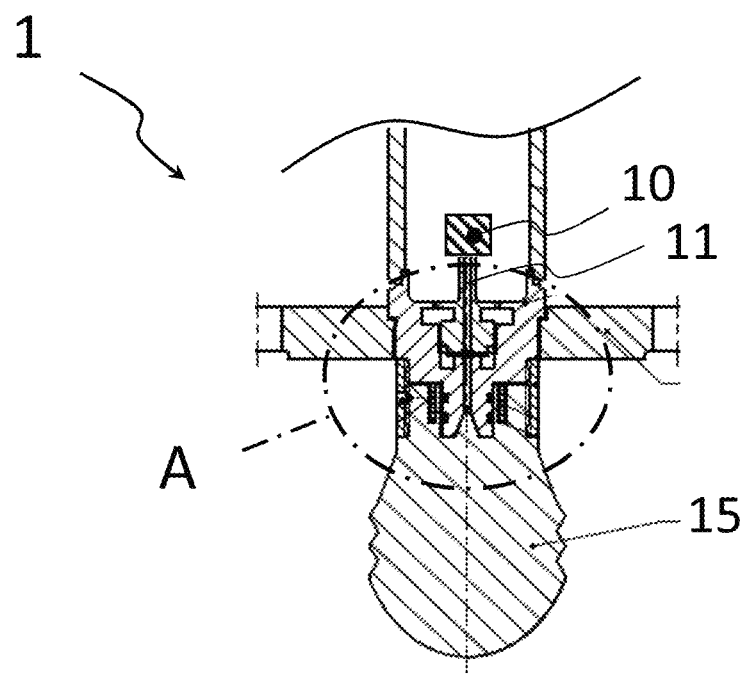
FIG. 2 shows a schematic view of the components of the fill level measurement device of the present disclosure.

Shown in cross sectional view in FIG. 2 are components of the fill level measurement device 1 critical in this connection:

A high frequency unit 10 serves for producing the high frequency signals $S_{HF}$ to be transmitted and for processing the reflected high frequency signals $R_{HF}$. The high frequency unit 10 includes the functional blocks required for the particular functional principle: In the case of implementing the FMCW method, the high frequency signal $S_{HF}$ can be produced by means of a PLL ("phase locked loop"); the received high frequency signal $R_{HF}$ can be mixed with the instantaneously transmitted high frequency signal $S_{HF}$, such that the distance d, and fill level L, can be ascertained from the difference frequency of the mixed signals. A correspondingly designed evaluation block can ascertain the difference frequency, for example, by means of an FFT ("Fast Fourier Transformation") of the mixed signal.

A hollow conductor 11, in the case of which at least its inner wall is electrically conductive to the signal line, is connected to the high frequency unit 10, in order to out-couple the high frequency signal $S_{HF}$ into the container 2 and to couple the high frequency signals $R_{HF}$ reflected in the container 2 back into the high frequency unit 10. In the case of the example of an embodiment shown in FIG. 2, the opening of the hollow conductor 11 directed toward the fill substance 3 is conically expanded, whereby a corresponding antenna is embodied.

A process isolation 15 of a material (for example, PMMA, PTFE or PC) transparent for the high frequency signals $S_{HF}$, $R_{HF}$ seals the antenna, and the hollow conductor 11, from the fill substance 3, in order to prevent penetration of the fill substance 3 into the hollow conductor 11.

Figure 3:
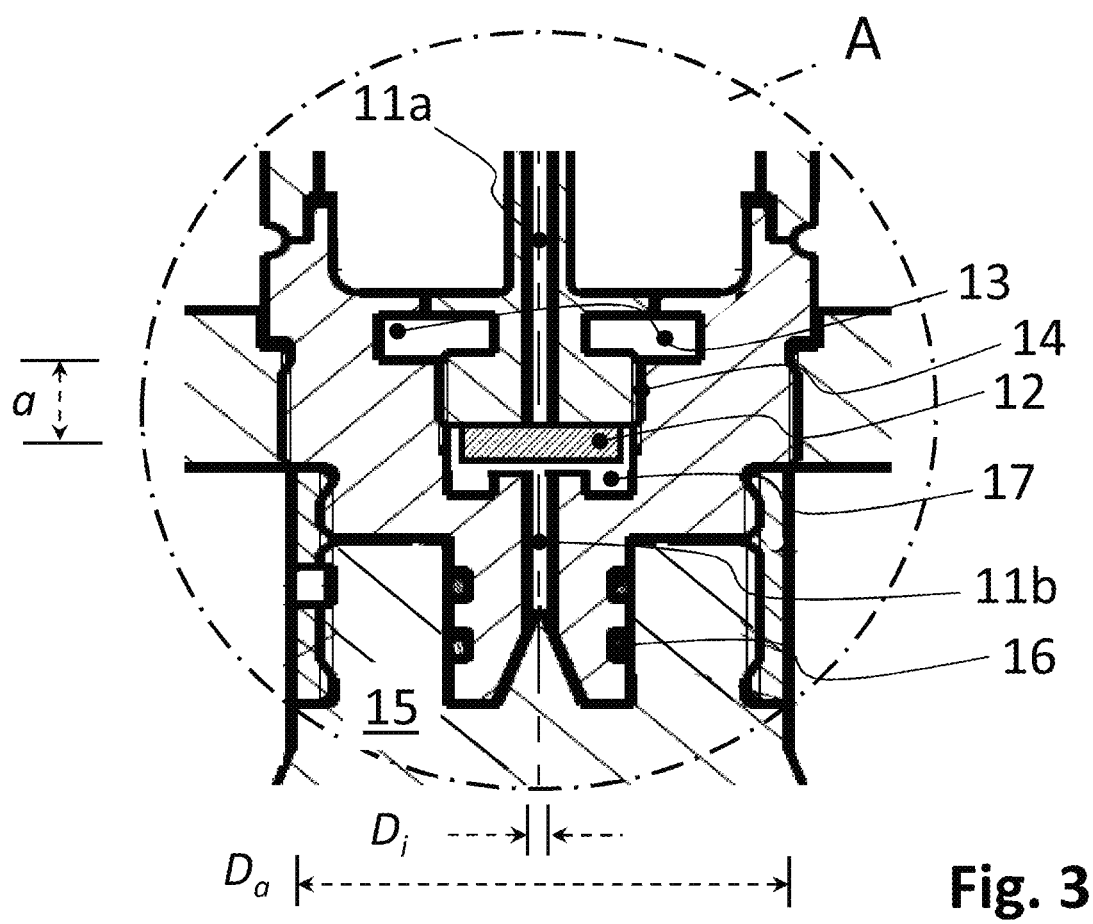
FIG. 3 shows a detail view of the essential components of the fill level measurement device.

FIG. 3 shows an enlarged detail A of the fill level measurement device 1 of FIG. 2. As can be seen from such a detail view, the hollow conductor 11 is sealed in the region of the antenna toward the process isolation 15 supplementally by two external sealing rings 16, since the process isolation 15 can, in given cases, not have the required accuracy of fit with the antenna. The pressure resistance of the fill level measurement device 1 is essentially achieved by an insulation 12 in the interior of the hollow conductor 11. The insulation 12 is in the illustrated example of an embodiment disc shaped and can, depending on the positive pressure to be expected, have a thickness between 200 μm and 5 mm. Ideally, the thickness equals the half wavelength of the high frequency signal $S_{HF}$, $R_{HF}$. Also, the insulation 12 is transparent for the high frequency signals $S_{HF}$, $R_{HF}$, thus, transmissive. Therefore, the material of the insulation 12 can be, for example, a glass.

Insulation 12 divides the hollow conductor 11 into a first portion 11a facing toward the high frequency unit 10 and a second portion 11b, which during operation faces toward the fill substance 3. Insulation 12 seals the two portions 11a,b fluid-tightly from one another. In such case, the hollow conductor 11 is so designed in the illustrated example of an embodiment that the second portion 11b forms a holder for the first portion 11a. In this regard, the first portion 11a has an external thread, while the second portion 11b has a corresponding internal thread, so that the first portion 11a of the hollow conductor 11 can be screwed via the resulting screw thread 14 into the second portion 11b forming the holder. Insulation 12 can, accordingly, such as shown in FIG. 3, be mounted on the first portion 11a, for example, by means of welding, before the screwing in.

Depending on material, the sealing rings 16 have only finitely small gas-permeability coefficients in the order of magnitude of $10^{-12}$ kg/(s*bar). As a result, in spite of the sealing rings 16, and in spite of the process isolation 15, with rising duration of operation, gases, such as gaseous portions of the fill substance 3, can diffuse into the second portion 11b of the hollow conductor 11. In order that, nevertheless, no condensation, for example, water condensation, occurs on the insulation 12, the fill level measurement device 1 of the invention includes a first hollow space 13. Such is arranged relative to the second portion 11b at a distance a behind the insulation 12, thus, in the region of the first portion 11a. In such case, the hollow space 13 is arranged in the illustrated embodiment rotationally symmetrically around the hollow conductor 11. In principle, a rotationally symmetric design of the first hollow space is, however, not obligatory within the scope of the invention. As can be seen in FIG. 3, the hollow space 13 is fluidically connected with the second portion 11b via the screw thread 14, so that a gas transport or pressure equalization can take place therethrough.

This has the result that, at high temperatures $T_C$ in the container 2, condensation takes place not on the insulation 12, but in the first hollow space 13, since the first hollow space 13 is arranged relative to insulation 12, according to the invention, further removed from the fill substance 3.

Accordingly, condensation formation on the insulation 12 can be avoided by lessening the thermal resistance $R_{th,H}$ of the hollow conductor 11 between the insulation 12 and the first hollow space 13, wherein $$R_{th,G} = \frac{1}{\lambda_H} * \frac{a}{A_H}$$

In such case, $\lambda_H$ is the thermal conductivity of the utilized hollow conductor-material with the units, W/(m*K). Stainless steel as potential material for the hollow conductor 11 has, for example, a thermal conductivity 2H of 15 W/(m*K).

$A_H$ is the cross sectional area of the hollow conductor 11 in the region between the insulation 12 and the first hollow space 13. The cross sectional area $A_H$ is in the case of rotationally symmetric design of the hollow conductor 11

$$A_H = \frac{\pi}{4}(D_o^2 - D_i^2)$$

In such case, is $D_o$ the outer diameter and $D_i$ the inner diameter of the hollow conductor 11. In the case of square design of the hollow conductor 11, the cross sectional area $A_H$ is alternatively $$A_H = D_a^2 - D_i^2$$

In such case, $D_o$ and $D_i$ are, respectively, the outer and inner edge lengths of the cuboid shaped hollow conductor 11.

A sufficient safety against condensate formation on the insulation 11 is provided, when thermal resistance $R_{th,H}$ is structurally is so established that at a temperature $T_C$ in the container 2 of at least 180° C. the temperature difference down to the temperature in the first hollow space 13 amounts to at least 30° C. The volume of the first hollow space 13 is preferably sized as a function of the permeability coefficients of the sealing rings 16, in order to prevent condensate formation on the insulation 12. A sufficient dimensioning rule is that the volume of the hollow space 13 should be at least 1.2 cm³ per permeability coefficient of the seal of $10^{-12}$ kg/(s*bar). In such case, taken into consideration is that the permeability coefficient of the sealing rings 16, in given cases, depends on the temperature $T_C$ in the container 2.

The fill level measurement device 1 shown in FIG. 3 includes an optional extension of the invention in the form of a second hollow space 17. In contrast with the first hollow space 13, the second hollow space 17 is located relative to the second portion 11b of the hollow conductor 11 in front of the insulation 12. In this way, the risk of condensate formation on the insulation 12 is supplementally reduced, since by the additional, second hollow space the pressure rise in the total hollow space is slowed and the pressure necessary for condensate formation is achieved later.

This extension can make sense, for example, when the first hollow space 13 for structural or manufacturing reasons cannot be dimensioned sufficiently large according to the above mentioned volume specification, or when the thermal resistance $R_{th,H}$ of the hollow conductor 11, for example, cannot, in turn, for structural reasons be reduced to the above described maximum value.

The invention claimed is:

1. A fill level measurement device for determining a fill level of a fill substance located in a container, comprising
a high frequency unit, which is designed to produce or process high frequency signals for determining fill level,
a hollow conductor, which is coupled to the high frequency unit for transmitting the high frequency signals to the fill substance or for receiving high frequency signals reflected on the fill substance, wherein the hollow conductor is subdivided into:
a first portion facing the high frequency unit, and
a second portion faceable toward the fill substance; and
an insulation transparent for the high frequency signals and separating the first portion fluidically from the second portion,
a first hollow space, which is connected fluidically with the second portion and is fluidically independent of the first portion, wherein the first hollow space is arranged relative to the second portion behind the insulation, wherein the first hollow space lies outside a hollow space defined by the hollow conductor;
wherein the first hollow space is designed to collect condensate from an interior of the container.

2. The fill level measuring device of claim 1, wherein a second hollow space, which is connected fluidically with the second portion, is arranged relative to the second portion in front of the insulation.

3. The fill level measuring device of claim 1, wherein the high frequency unit is designed to produce the high frequency signals with frequencies greater than 75 GHz.

4. The fill level measuring device of claim 1, wherein thermal resistance of the hollow conductor between the insulation and the first hollow space is sized according to the following formula:

$$|R_{th,G} = \frac{1}{\lambda_H} * \frac{a}{A_H}.$$

5. The fill level measuring device of claim 1, wherein a screw thread connects the first hollow space fluidically with the second portion.

6. The fill level measuring device of claim 1, including a process isolation, which blocks an end region of the second portion faceable toward the fill substance.

7. The fill level measuring device of claim 6, wherein a fluidic seal composed of at least one sealing ring is arranged between the process isolation and the end region of the second portion.

* * * * *